United States Patent

[11] 3,621,472

[72] Inventor Frederick Rothwarf
Philadelphia, Pa.
[21] Appl. No. 820,193
[22] Filed Apr. 29, 1969
[45] Patented Nov. 16, 1971
[73] Assignee The United States of America as represented by the Secretary of the Army

[54] SUPERCONDUCTING FREQUENCY CONVERTER SYSTEM
11 Claims, 9 Drawing Figs.

[52] U.S. Cl. .......... 332/20, 332/51, 332/52
[51] Int. Cl. .......... H03c 3/00
[50] Field of Search .......... 307/245, 306; 331/107 S; 332/20, 51, 52; 324/43

[56] References Cited
UNITED STATES PATENTS

| | | | |
|---|---|---|---|
| 3,040,247 | 6/1962 | Van Allen .......... | 324/43 |
| 3,363,200 | 1/1968 | Jaklevic et al. .......... | 332/51 |

OTHER REFERENCES

J. Clarke " A Superconducting Galvanometer Empolying Josephson Tunnelling" Philosophical Magazine Vol. 13, pp. 115- 127 1966.

*Primary Examiner*—Roy Lake
*Assistant Examiner*—Lawrence J. Dahl
*Attorneys*—Harry M. Saragovitz, Edward J. Kelly, Herbert Berl and S. Dubroff

ABSTRACT: A frequency converter system for use in the superconducting range of temperature based upon the Josephson tunnelling effect, in which the detector element or device consists of a bead of lead-tin solder frozen about a fine niobium wire. A time-varying field current applied to the niobium wire produces an output signal of greatly increased frequency. This frequency converter is used to determine to a high degree of sensitivity the magnetic and resistive properties of materials by magnifying the frequency of current induced into a search coil with the material as a core.

INVENTOR,
FREDERICK ROTHWARF
BY: Harry M. Saragovitz, Edward J. Kelly, Herbert Berl & S. Dubroff
ATTORNEYS INVENTOR,
FREDERICK ROTHWARF
BY: Harry M. Saragovitz, Edward J. Kelly, Herbert Berl & S. Dubroff
ATTORNEYS.

SUPERCONDUCTING FREQUENCY CONVERTER SYSTEM

STATEMENT OF GOVERNMENT INTEREST

The invention described herein may be manufactured, used and licensed by or for the Government for governmental purpose without the payment to me of any royalty thereon.

BACKGROUND OF THE INVENTION

The present invention relates to frequency conversion and modulation systems for use at relatively low temperatures. The system makes use of the known Josephson tunnelling effect using a detector element consisting of a bead of lead-tin solder frozen about a fine niobium wire and with a junction formed inside the bead where the oxide film on the wire is thin. Such devices have been employed to measure DC voltages with a high degree of sensitivity.

It is an object of this invention to provide a simplified low-temperature or superconducting frequency converter and modulation system which can be adapted to combine a junction device of the type referred to with search-coil circuitry for gaussmeter, magnetometer and eddy-current resistivity measurements as well as frequency conversion and permeability measurement.

SUMMARY OF THE INVENTION

In accordance with one form of the invention, a multiply connected junction device, consisting of a drop of solder frozen about a fine niobium wire, is supplied with a time-varying drive current therethrough. A junction current is applied to the niobium wire and the solder bead. The junction output voltage is monitored at the connections formed by the niobium wire and the bead, this voltage additionally being utilized for other measurement purposes as the amplitude of a time-varying drive current through the niobium wire is changed.

If the device is biased with a constant direct current less than a predetermined critical value, no voltage will appear across the output voltage leads from the junction. As the field or drive current through the niobium wire is raised from zero, a series of voltage pulses will appear across the junction since the critical current of the junction is periodically lowered as a function of the drive current through the wire and the number of voltage pulses is increased with an increase in drive current amplitude.

This operation can be understood more clearly if it is first considered that, at least in theory, the thin spots in the oxide coating of the niobium wire give rise to two or more parallel weak contact regions between the solder and the niobium which are thus multiply connected.

A typical voltage-junction current plot frequency-modulated an antisymmetric tunnelling curve with zero voltage across the junction until a certain critical current $I_{jc}$ is supplied.

A field or drive current $I_H$ flowing through the niobium wire produces a magnetic flux which links the multiply connected regions formed by the penetration depths of the solder, the niobium, and the distances between the parallel weak contacts. The critical current $I_{jc}$ is a periodic function of the magnetic flux threading the multiply connected regions, the modulation period being proportional to one flux quantum. When the device is biased with a junction current $I_j$ in interval $I_{jc} \leq I_j \leq 3I_{jc}$, and $I_H$ is varied, a modulated DC voltage, i.e., a series of unidirectional voltage pulses, appears across the junction. The period of the oscilliations or pulses is substantially a function of the junction bias current $I_j$.

The number of cycles $\Delta N$ produced for a given absolute change $|\Delta I_H|$ defines the junction constant $K_j$ of the device. $K_j$ depends upon the geometry of the device and the penetration depths of the superconductors used in its construction, as will be seen hereinafter.

The invention will further be understood from the following description, when considered with reference to the accompanying drawings, and its scope is indicated by the appended claims.

DRAWINGS

DESCRIPTION OF THE PREFERRED EMBODIMENT

Figure 1:
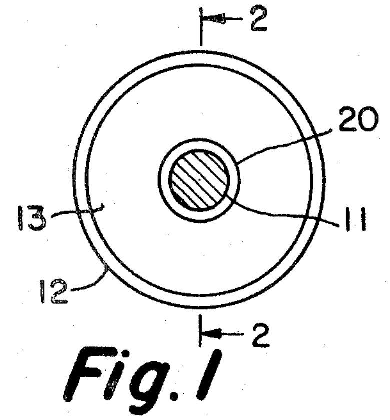
FIG. 1 is an enlarged end view showing the niobium wire, a copper wire, and a drop of solder in accordance with the present invention.
Figure 2:
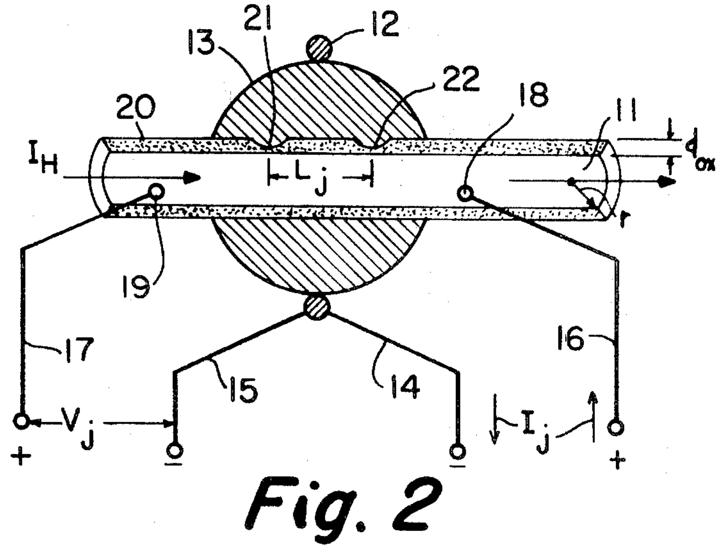
FIG. 2 is a cross-sectional view of the wire and solder bead of FIG. 1 taken along the section line 2—2.

Referring to the drawings, wherein like reference characters refer to like elements throughout the various figures, and referring particularly to FIGS. 1 and 2, the frequency conversion element of the present system comprises a relatively short length of niobium wire 11 of from 4 to 5 mils in diameter which is passed through the axis and normal to the plane of a relatively tight loop 12 of copper wire having a relatively small diameter, such as No. 28 B & S gauge. A tiny drop or body of lead-tin solder 13 is formed about the niobium wire within the loop and is in intimate contact with both the loop and the wire, as shown in FIG. 2. The copper wire loop 12 serves as a negative voltage and current connection for the device and is connected with a negative junction current input lead 14 and a negative junction voltage output lead 15.

The niobium wire 11 itself provides the positive voltage and current connection for a positive junction current input lead 16 and a positive junction voltage output lead 17, as shown in FIG. 2. The leads 16 and 17 are connected respectively at terminals 18 and 19 on the niobium wire outside the solder bead and closely adjacent thereto. The niobium wire is processed before use by heat treating at 125° C. in air for approximately 18 to 20 hours to form a thick oxide layer or coating 20 thereon and is then very lightly scraped along its length to reduce the thickness of the oxide layer to a very thin film at least at two places in spaced relation to each other in the region where the solder bead is to be placed. Two such spots or junctions are indicated in the present example in FIG. 2 at the points 21 and 22, respectively.

In theory, at least two junctions are provided beneath the solder bead in the regions where the oxide layer is thin enough to permit tunnelling. The length of wire between the junctions 21 and 22 in the present example will effectively have a multiply connected region or hole through which flux due to the field or drive current $I_H$ carried by the niobium field wire 11 can link the junctions. The multiply connected region or hole exists because of the finite penetration depths for the magnetic field in the niobium wire and the lead-tin solder bead.

This type of junction is superconducting and thus no output voltage $V_j$ will appear at the leads 15 and 17 across the oxide layer until the junction current $I_{cj}$ applied to the leads 14 and 16, reaches a critical value $I_{jc}$. Above this value an exponential rise in voltage occurs with increasing $I_j$. When the field current $I_H$, as indicated in FIG. 2, is sent through the niobium wire 11, its magnetic flux H (not shown) will link the hole between the junctions 21 and 22, causing the value of this critical current $I_{jc}$ to decrease periodically as a flux quantum $\Phi_o$ pass through the hole. Minimum values of $I_{jc}$ occur for $H-(n+1/2)\Phi_o$ where $n$= an integer.

In accordance with the invention, the junction device or element of FIGS. 1 and 2 is part of a search-coil circuit in a system which can be used in a gaussmeter, a magnetometer, or an eddy-current resistivity measuring device, as well as for frequency conversion.

Figures 3, 7, 8, 9:
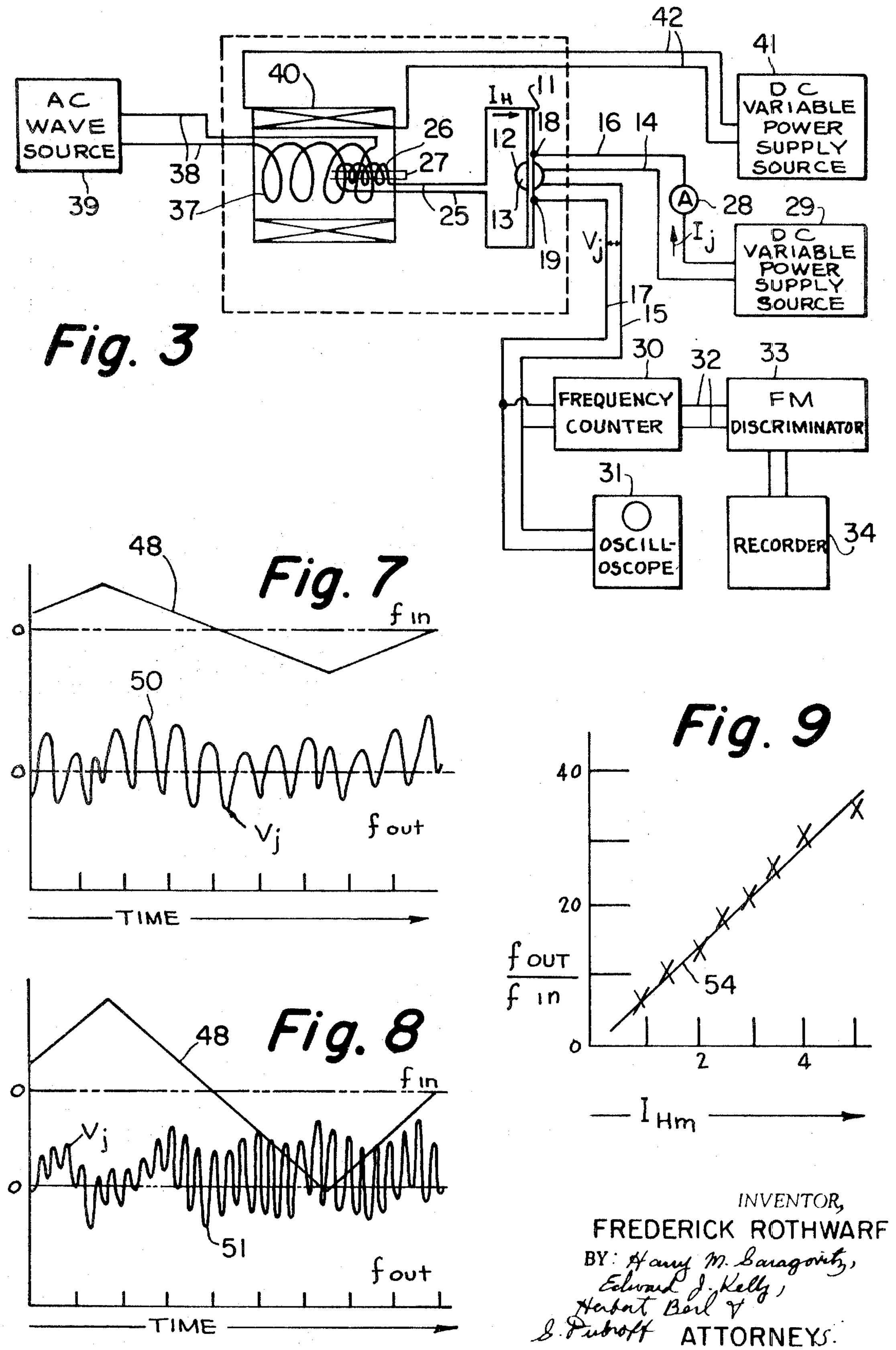
FIG. 3 is a schematic circuit diagram of a permeability measurement system employing the superconducting frequency converter of the present invention with the device of FIGS. 1 and 2 shown therein for operation in accordance with the invention.

Referring now to FIG. 3 along with FIGS. 1 and 2, the short length of niobium wire 11 is shown connected at its ends through supply leads 25 to a source of alternating current provided by a pickup coil 26 within which is positioned a core element 27. In the present example, the core element 27 is a body of material having an unknown permeability. It is desired to determine this permeability by the system shown. The junction current supply lead 16 is connected to a DC variable supply source 29. Junction current supply lead 14 is also connected (through a suitable milliammeter or microammeter device 28) to the source 29. The junction voltage output leads 15 and 17 are connected to a frequency counter 30 and an oscilloscope 31. From the frequency counter a connection, via leads 32, is provided for a frequency modulation discriminator circuit indicated by the element 33 which, in turn, is connected to a suitable recorder 34.

The search coil 26 is movable through the axis of a larger, surrounding, exciting or coupling coil 37 which is supplied with an input alternating current wave from a supply source 39 through supply leads 38. Source 39 may be an oscillator or generator for producing waves of any shape and of any desired amplitude or magnitude. Such waves may, for example, be triangular, sinusoidal, or other known configurations. In the present example, source 39 may be considered to provide an output wave of substantially one kilocycle per second, the shape thereof being discussed hereinafter.

Surrounding the coils 26 and 37 and coaxial therewith is a superconducting magnet or field coil 40 which is supplied with exciting current from a DC variable supply source 41, through supply leads 42. Source 41, through coil 40, provides a magnetic field which links coils 26 and 37 and causes them to operate in a saturated or semisaturated magnetic region. In this way the susceptibility of the core material 27 is controlled at superconducting temperatures. Accordingly, the coils and the niobium wire control device are located in a low-temperature region, as indicated by the dashline rectangle 43 that can be sealed off and thermally isolated.

The operation of the system as shown in FIG. 3 is as follows. The multiply connected junction device comprising the wire 11 and the lead-tin solder bead 13, as described in conjunction with FIGS. 1 and 2, is connected into the system of FIG. 3 and provides a variable junction current $I_j$ via leads 14 and 16 and a resultant output frequency variation of the junction voltage $V_j$, taken through and across the output leads 15 and 17. The variable field current $I_H$ is supplied from the search coil 26 through the leads 25 as the coil is moved through the interior of and parallel to the axis of the exciting coil 37. It should be noted, however, that the search coil 26 may be stationary or movable, as desired, and may contain a body of magnetic material, such as the core 27, the magnetic properties of which are to be ascertained in the manner hereinbefore referred to, as the system is operated.

The alternating current wave source 39 may supply a triangular wave or a sinusoidal wave as may be desired, depending upon whether frequency conversion or frequency modulation is the major consideration to be determined. In any case the AC wave source, whether a generator or an oscillator, is put into operation and connected with the coil 37 through the leads 38 for energizing the search coil 26 by inductive coupling therewith. The magnetic field is provided by the superconducting magnet or winding 40 when supplied with energy through the leads 42 from the supply source 41.

The output signal, whether frequency-modulated or a conversion frequency, is applied to the oscilloscope 31 and displayed. Additionally, the wave shape is routed to frequency counter 30 which counts the number of pulses resulting from the conversion or modulation. The FM discriminator 33 connected to the counter 30 derives the modulation component generally when the input wave is sinusoidal, although it operates for any wave shape that is frequency-modulated. The recorder 34 may be of any suitable type for recording the modulation envelope of the modulated input to the discriminator 33.

From the foregoing it will be seen that if a time-varying magnetic flux $\Phi(t)$ is applied to the search coil 26 from the source 39 through the coupling coil 37, for example, it will induce the current, $I_H$, in the search coil 26 that will pass through the niobium field control wire 11. If $\Phi(t)=A_{sc}H(t)$, where $A_{sc}$ is the cross-sectional area of the search coil 26 and $H(t)$ is the applied AC field and if $N_{sc}$ is the number of turns in the search coil 26 then, (1) $I_H(t)=e_{sc}/Z_{sc}$ where, $e_{sc}$ is the voltage across the cross section and $Z_{sc}$ is the impedance of the search coil circuit Applying Faraday's law of induced EMF, (1a) $I_H(t)=-10^{\cdot 7E^{\cdot}8}N_{sc}/Z_{sc}(d\Phi/dt)=-10^{\cdot 7E^{\cdot}8}N_{sc}/Z_{sc}u^{A}{}_{sc}\ \dot{H}(t)$ where, $u$ is the permeability of the material in the coil.

Figure 6:
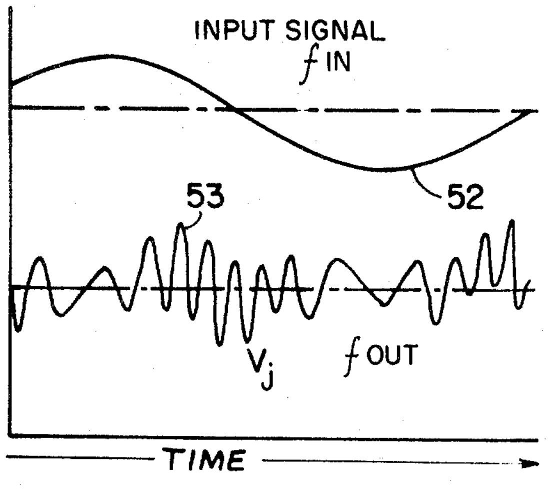
FIGS. 6–9, inclusive, are further graphs showing curves illustrating certain other operating characteristics in accordance with the invention.

Upon defining a search coil constant $C=10^{\cdot 7E^{\cdot}8}N_{sc}{}^{A}sc/Z_{sc}$, and substituting into equation (1a), (2) $I_H(t)=-uC\dot{H}(t)$ Furthermore, if, as above, and referring to FIGS. 6, 7 and 8, which are actual oscilloscope pictures, a time varying $I_H$ of a frequency $f_{in}$ is applied to the niobium wire 11 through the search coil 26, the junction voltage $V_j$ will vary at some output frequency $f_o$. This can be calculated by the relation, (3) $f_o=K_j dI_H/dT$ where, $k_j$ is the junction constant of the device as noted heretofore.

For a triangular $I_H$ input wave or signal as the hold or drive current, represented by the curve 48 in FIGS. 7 and 8, the device acts as a frequency multiplier as shown by the curves 50 and 51 respectively in FIGS. 7 and 8. This relation may be expressed as:

(4) $f_o=4K_jI_{Hm}f_{in}$ where, $I_{Hm}$ is the current amplitude of the triangular waveform and $f_{in}$ is the frequency thereof.

A sinusoidal $I_H$ input wave or signal, represented by the curve 52 in FIG. 6, gives rise to a frequency-modulated output variation of $V_j$ show by the curve 53 of FIG. 6. For this case, $f_o$ may be expressed as:

(5) $f_o=2\pi K_jI_{Hm}F_{fin}\cos 2\pi f_{in}t$.

Other input waveforms yield other frequency1modulated outputs.

The $V_j$ pattern, shown in FIGS. 6, 7, and 8, clearly show the frequency conversion and modulation predicted by equations (4) and (5). The oscilloscope curves 50 and 51 in FIGS. 7 and 8, respectively, also show how the output frequency $f_o$ is increased as the amplitude of the triangular input waveform 48 is increased. The frequency modulation effect is also seen from the oscilloscope curve 53 in FIG. 6 for the sinusoidal input signal 52. It is clear from the foregoing discussion and the graphs shown, that the output frequency is modulated by the function $|\cos 2\pi f_{in}t|$. FIG. 9 shows a curve 54 resulting from plotting the frequency increase of ratio of output to input frequency against input signal amplitude $I_{Hm}$ and above the great frequency multiplication that can be obtained by increasing the amplitude of the $I_H$ waveform. The graph was made utilizing a 1kc./sec. input frequency. Similar results have been obtained for input frequencies as high as 10kc./sec.

Figure 4:
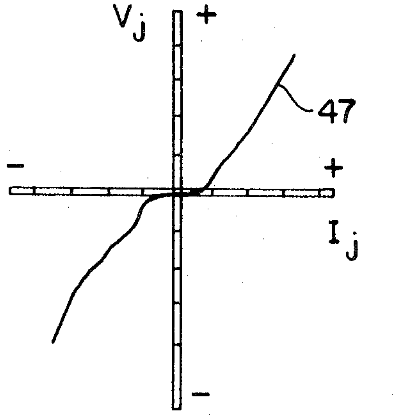

As as been pointed out hereinbefore, a Josephson junction is superconducting and thus no voltage $V_j$ will appear at leads 15 and 17 across the oxide layers 20 until the junction current, $I_j$, applied to leads 14 and 16, reaches the critical value, $I_{jc}$. Above this value an exponential rise in voltage occurs with increasing $I_j$, as is seen in FIG. 4. When a current $I_H$ is sent through the niobium wire 11 from the coil 26, its magnetic flux links the hole between the junctions 21 and 22 causing the value of the critical current $I_j$ to decrease periodically as flux quanta $\Phi$ pass through the hole.

Figure 5:
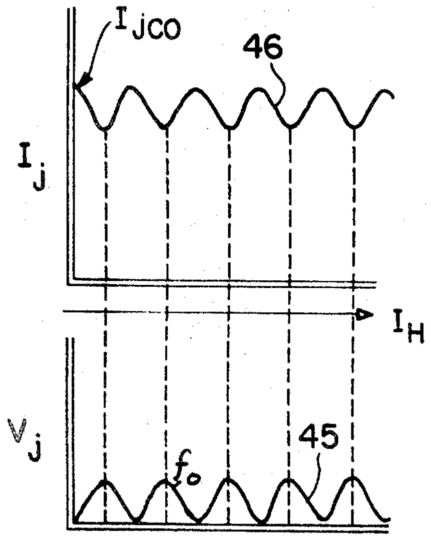
FIGS. 4 and 5 are graphs showing curves illustrating certain operating characteristics of the device of FIGS. 1 and 2.

Therefore, if the junction device is biased with constant DC current, $I_j$, just less that the critical current $I_{jc}$ (with no field or field current, $I_H$, flowing) no voltage will appear across the voltage leads 15 and 17. As the current $I_H$ is raised from zero, a series of voltage pulses, as shown by the curve 45 in FIG. 5, appear across the junction since the critical current of the junction $I_{jc}$ will be periodically lowered as a function of $I_H$ (or in reality the flux produced by $I_H$) below the initial value, $I_{jco}$ as shown by the curve 46 in FIG. 5. It is to be noted that this series of voltage pulses appears upon either raising or lowering $I_H$. However, since the junction $V_j$ vs. $I_j$ characteristic of FIG. 4 is nonsymmetric about the origin, a change in the sign of $I_j$ will change the polarity of the voltage across the junction. Nonetheless, for a given direction of $I_j$, the voltage pulses across the junction will correspond in sign to that of $I_j$, and the voltage pulses across the junction will also correspond in sign to that of $I_j$, independent of the direction of $I_H$. Thus, the number of counts N observed for a given change in $I_H$ will depend only on the absolute value of $I_H$. In the time domain this may be expressed as:

(6) $N(t)=K_j|I_H(t)|$

A given set of junctions will have a certain number of critical current oscillations, N, per ampere change in field current $I_H$. This phenomena is included within the junction constant, $K_j$, mentioned heretobefore. The value of $K_j$ depends upon several geometrical boundary conditions, to wit: the diameter of a given superconducting wire; the penetration depths $\lambda$ of the superconductors used for the wire and the solder, respectively; and the distance between oxide thin spots 21 and 22 where tunnelling can occur.

The constant $K_j$ can be defined as follows:

for a unit having only two parallel junctions, a distance $L_j$ apart, as here, $K_j$ is given by (7) $K_j=L_j(\lambda_1+\lambda_2+d_{ox})\,5\Phi_o\,r$ where, $\Phi_o$ is $2\times10^{-7}$ gauss-cm.$^2$ which is the vaLue of the flux quantum; where $L_j$ is the distance along the niobium wire 11 between the junctions 21 and 22; $r$ is the radius of the niobium wire; and $d_{ox}$ is the thickness of the oxide layer 20.

$K_j$ can also be expressed as:

(8)
$$K_j=\frac{dN}{|dI_H|}=\frac{\frac{dN}{dt}}{\frac{|dI_H|}{dt}}$$

However, since $dn/dt=f_o$, the output frequency of the double junction, then:

(9)
$$f_o=K_j\frac{|d^IH|}{dt}=K_j|\dot{I}_H|$$

Equation (9) is the fundamental equation for applications of the device in accordance with the invention. Upon differentiating equation (2) and substituting for $\dot{I}_H$, equation (9) becomes:

(10) $f_o=K_j uC|\dot{H}(t)|$

For the case where the modulation field is sinusoidally varying as, for example, of the form $H=H=H\sin\omega t$, then (10a)
$$|\ddot{H}(t)|=H_o\omega^2\sin\omega t|$$

The output frequency of the device is thus given by:

(11) $f_o=K_juCH_ow^2|\sin wt|$

There is thus provided a frequency modulated output, as shown in FIG. 6, of the form shown in equation (11). Since $w_o=2\pi f_o$,

(12) $w_o=2\pi K_juCH_ow^2|\sin wt|$, therefore:

(12a) $w_o=w_om|\sin wt|$ where, $w_{om}=2\pi k_juCH_ow_2$.

In the system shown it can be seen that the output frequency depends upon the square of the modulating or input frequency, thus giving a large magnification for studying $u$ the permeability of any material filling the search coil. This is one of the main applications of the system, that is, to permit a sensitive study to be made of the magnetic properties of materials, such as that of the core 27 in the coil 26.

It is noted that other applications for the device employing the various electronic and frequency modulation techniques should become readily apparent since the amplitude of the signal coming out of the FM discriminator 33 is proportional to the square of the modulation frequency.

Other search coil applications are also apparent, for example, an eddy-current technique may be employed to measure the resistivity of a very pure, single, metal crystal having a very low resistivity. The search coil 26 is wrapped about the sample and the decay of induced current is measured after a static magnetic field (applied parallel to the coil axis) is turned off. The flux through the coil 26 decays as;

(13) $H=H_oe^{-t/\tau}$ where, the time constant $\tau$ is inversely proportional to the sample resistivity. Using such a technique with a junction device, the output frequency is:

(14)
$$f_o=K_jCu\frac{H_oe^{-t/\tau}}{\tau 2}$$

Thus by measuring the decay in output frequency or the initial amplitude or value of the frequency, the resistivity in very pure metals may be determined.

I claim:

1. A superconducting frequency converter system for determining properties of a test material to a high degree of sensitivity, comprising:

means providing a low-temperature region;

frequency converter means in said region comprising a length of niobium wire having a lead-tin bead thereon and an interposed oxide layer having at least two thin spots within the confines of said bead for providing multiply connected Josephson junctions;

a pair of junction current supply leads connected one to said bead and the other to said niobium wire outside of the confines of said bead;

a junction current supply source connected to said leads for applying to said frequency converter means a constant direct current having a magnitude just below the critical value for junction voltage output from said frequency converter means;

a pair of junction voltage output leads connected one to said bead and the other to said niobium wire outside of the confines of said bead;

means connected to said voltage output leads including an oscilloscope for visually indicating the waveshape of the output junction voltage;

a frequency discriminator connected to said voltage output leads for determining a frequency characteristic of said output junction voltage;

a movable signal pickup coil adapted to receive a core of the test material, positioned within said low-temperature region and connected to the ends of said niobium wire for applying a variable field current thereto in the form of an alternating current wave of predetermined frequency;

an excitation winding for said pickup coil positioned in axial alignment therewith;

a superconducting magnetic winding surrounding said pickup coil and said excitation winding;

a direct current variable power supply source connected to said superconducting winding for applying an energizing current thereto to thereby establish a magnetic field about said pickup coil and excitation winding; and a low-frequency alternating current wave source connected to said excitation winding for providing thereto alternating current waves of predetermined wave shape and variable amplitude.

A superconducting frequency converter system as defined in claim 1, wherein:

a frequency counter is interconnected between said voltage output leads and said frequency modulation discriminator.

3. A superconducting frequency converter system as defined in claim 2, wherein:

said alternating current wave source provides a triangular waveshape the amplitude of which is variable to provide frequency conversion at a variable output frequency for the junction voltage derived through said voltage output leads 4. A frequency converter system for determining a characteristic of a test material, comprising:

frequency converter means for converting an input signal in the form of a time-varying current to a readily measurable output frequency, said converter comprising a Joesphson tunnelling device;

input means connected to said frequency converter means for applying a variable field current thereto, wherein said current is dependent upon properties of the test material;

said input means including a signal pickup coil surrounding the test material and connected to said frequency converter means, an excitation winding positioned in coaxial alignment with said pickup coil, and a low-frequency alternating current wave source connected to said excitation winding for providing thereto alternating current waves of predetermined waveshape and variable amplitude and counter means connected to said frequency converter means for measuring the output frequency thereof;

whereby the output frequency measured by said counter is dependent upon the field generated by said excitation winding and is a function of the characteristic of the test material.

5. A frequency converter system for determining the characteristic of a test material comprising:

a frequency converter means for converting an input signal in the form of a time-varying current to a readily measurable output frequency;

input means connected to said frequency converter means for applying a variable field current thereto, wherein said current is dependent upon properties of the test material;

said input means including a signal pickup surrounding the test material and connected to said frequency converter means, an excitation winding positioned in coaxial alignment with said pickup coil, and a low-frequency alternating current wave source connected to said excitation winding for providing thereto alternating current waves of predetermined waveshape and variable amplitude; and counter means connected to said frequency converter means for measuring the output frequency thereof;

whereby the output frequency measured by said counter is dependent upon the field generated by said excitation winding and is a function of the characteristics of the test material; and further including a low-temperature area having a temperature less than the lowest superconducting temperature of the materials used therein, and wherein said frequency converter means comprises:

a niobium wire having a solder bead thereon within said low-temperature area, said wire having an interposed oxide layer therearound with at least two thin spots therein within the confines of said bead to provide multiply connected Josephson junctions;

first and second junction current supply leads, said first current lead connected to said bead and said second current lead connected to said niobium wire outside the confines of said bead;

current supply means connected to said supply leads for applying a junction-biasing current thereto; and first and second voltage output leads, said first voltage lead connected to said bead and said second voltage lead connected to said niobium wire outside of the confines of said bead 6. A frequency converter system for determining a characteristic of a test material, comprising:

frequency converter means for converting an input signal in the form of a time-varying current to a readily measurable output frequency, said frequency converter means comprising a Josephson tunnelling device;

input means connected to said frequency converter means for applying a variable field current thereto; wherein said current is dependent upon the properties of the test material;

said input means including the test material and field means surrounding said pickup coil for establishing a DC magnetic field about said pickup coil and counter means connected to said frequency converter means for measuring the output frequency thereof as a function of time whereby said unknown characteristic is determined.

7. A frequency converter system for determining a characteristic of a test material, as described in claim 6, wherein said input means is located within a variable temperature area so that the characteristics of the test material may be determined over a wide range of temperatures.

8. A frequency converter system for determining a characteristic of a test material, as described in claim 7, wherein said input means further comprises:

field means surrounding said pickup coil and said excitation winding for establishing a DC magnetic field about said pickup coil and said excitation winding, whereby discontinuance of said DC magnetic field results in an exponentially decaying flux in the test material thus inducing a similar exponentially decaying flux in the test material thus inducing a similar exponentially decaying voltage in said pickup coil.

9. A frequency converter system for determining a characteristic of a metallic specimen, as described in claim 8, wherein said field means comprises a magnetic winding coaxially positioned with respect to said pickup coil and said excitation winding; and a direct-current variable power supply source connected to said magnetic winding for applying an energizing current thereto to thereby establish a magnetic field about said pickup coil and said excitation winding.

10. A frequency converter system for determining a characteristic of a test material, as described in claim 6 wherein said field means comprises:

a magnetic winding coaxially positioned with respect to said pickup coil; and a direct current variable power supply source connected to said magnetic winding for applying an energizing current thereto to thereby establish a magnetic field about said pickup coil.

11. A frequency converter system for determining a characteristic of metallic specimen, as described in claim 10, further including a low-temperature area having a temperature less than the lowest superconducting temperature of the materials used therein, and wherein said frequency converter means further comprises:

a niobium wire having a solder bead thereon within said low-temperature area, said wire having an interposed oxide layer therearound with at least two thin spots therein within the confines of said bead to provide multiply connected Josephson junctions;

first and second current supply leads, said first and second current lead connected to said niobium wire outside the confines of said bead, current supply means connected to said supply leads for applying a junction-biasing current thereto; and first and second voltage output leads, said first voltage lead connected to said bead and said second voltage lead connected to said niobium wire outside of the confines of said bead.